United States Patent [19]

Jones

[11] Patent Number: 5,236,645
[45] Date of Patent: Aug. 17, 1993

[54] ADDITION OF ADDITIVES TO POLYMERIC MATERIALS

[75] Inventor: Frank R. Jones, Asheville, N.C.

[73] Assignee: BASF Corporation, Parsippany, N.J.

[21] Appl. No.: 902,448

[22] Filed: Jun. 19, 1992

Related U.S. Application Data

[63] Continuation of Ser. No. 586,636, Sep. 21, 1990, abandoned.

[51] Int. Cl.$^5$ ............................. D01F 1/02; D01F 1/04
[52] U.S. Cl. ..................................... 264/78; 264/211; 264/211.22; 264/211.23
[58] Field of Search ....................... 264/78, 210.6, 211, 264/211.21, 211.22, 211.23

[56] References Cited

U.S. PATENT DOCUMENTS

| | | | |
|---|---|---|---|
| 2,836,851 | 6/1958 | Holt | 264/211.23 |
| 3,023,456 | 3/1962 | Palfey | 18/12 |
| 3,040,005 | 6/1992 | Bernhardt et al. | 260/78 |
| 3,078,512 | 2/1963 | DeHaven | 264/211.23 |
| 3,376,603 | 5/1968 | Colombo | 18/8 |
| 3,410,938 | 11/1968 | Schippers | 264/102 |
| 3,563,514 | 2/1971 | Shattuck | 259/9 |
| 3,742,093 | 6/1973 | Skidmore | 260/893 |
| 3,846,507 | 11/1974 | Thomm et al. | 260/857 TW |
| 4,065,532 | 12/1977 | Wild et al. | 264/68 |
| 4,098,741 | 7/1978 | Login | 260/978 |
| 4,185,060 | 1/1980 | Lodney, Jr. | 264/211.23 |
| 4,294,749 | 10/1981 | Papenfuhs et al. | 260/40 P |
| 4,317,766 | 3/1982 | Kawasaki et al. | 524/101 |
| 4,342,844 | 8/1982 | Torenbeek et al. | 525/387 |
| 4,374,641 | 2/1983 | Burlone | 8/557 |
| 4,405,734 | 9/1983 | Fuchs et al. | 524/90 |
| 4,744,934 | 5/1988 | Christy | 264/211.23 |
| 4,750,910 | 6/1988 | Takayanagi et al. | 8/563 |
| 4,755,585 | 7/1988 | Hanson et al. | 528/182 |
| 4,830,801 | 5/1989 | Rossbeyer et al. | 264/211.23 |
| 4,877,823 | 10/1989 | Plachetta et al. | 524/80 |
| 4,992,222 | 2/1991 | Banevicius et al. | 264/211.23 |

FOREIGN PATENT DOCUMENTS

| | | | |
|---|---|---|---|
| 0056123 | 7/1981 | European Pat. Off. | |
| 0125483 | 11/1984 | European Pat. Off. | |
| 2444584 | 1/1979 | Fed. Rep. of Germany. | |
| 56-70931 | 6/1981 | Japan | 264/211.23 |
| 57-22032 | 2/1982 | Japan | 264/211.23 |
| 58-147332 | 9/1983 | Japan | 264/211.23 |

OTHER PUBLICATIONS

Bennett, D. "Requirements for Dispersions in Fiber Processing", IFJ, Aug., 1989, pp. 12, 14, 16, 19, 20, 22, 23 and 24.

Primary Examiner—Leo B. Tentoni
Attorney, Agent, or Firm—Karen M. Dellerman

[57] ABSTRACT

Additives are introduced into a thermoplastic melt by feeding at least one additive in an aqueous vehicle containing a dispersant to form an aqueous additive stream to a vented extruder which is extruding a thermoplastic followed by volatilizing an aqueous portion of the aqueous additive stream and removing substantially all the volatilized aqueous portion through the extruder vent to achieve a substantially homogeneous system containing the thermoplastic and at least one additive and forming a fiber from the homogeneous system by extrusion of the system through a spinneret.

23 Claims, No Drawings

ADDITION OF ADDITIVES TO POLYMERIC MATERIALS

This is a continuation of copending application Ser. No. 07/586,636 filed on Sep. 21, 1990 now abandoned.

BACKGROUND OF THE INVENTION

This invention relates generally to the preparation of admixtures from thermoplastics. More specifically, the invention relates to the addition to a polymer melt of additives in a partially volatile liquid vehicle followed by removal of the vehicle.

It is known to modify the characteristics of thermoplastic materials by addition of additives. This addition normally occurs prior to the shaping step, that is, prior to spinning or other extrusion, injection molding, etc. For example, colorants, stabilizers, delusterants, flame retardants, fillers, antimicrobial agents, antistatic agents, optical brightness, extenders, processing aids and other functional additives are used to impart preferred properties to the host polymer to which they are added. By way of illustration, the coloring of thermoplastic articles by incorporation of pigments introduced as color concentrates is well known. For the purposes of the present application, a concentrate contains the additive at a much higher loading than is desired in the final thermoplastic article. Typically, the coloring of fibrous materials through the use of color concentrates has presented unique challenges. The reasons for this are many fold. For instance, the amount of pigmentary particles dispersed in the concentrate must be high enough to impart satisfactory color density and yet must not be so high as to interrupt the spinning process.

When adding materials to nylon 6, moisture levels in the additive have formerly been kept as low as practical. The presence of excessive levels of water causes depolymerization and reduces the molecular weight and melt viscosity of nylon 6 to the point where bubbles will form in the extrudate or where fiber can no longer be formed. As a consequence, it has been important to keep moisture levels of concentrates low.

Pigment concentrate production may be performed by preparing a dispersion of the pigment in an aqueous medium. To achieve satisfactory dispersion, a water dispersible/soluble polymer may be used. It is normal in concentrate production to flush the pigment from an aqueous dispersion to an organic phase in a separate step prior to extrusion.

Another method of preparing pigment concentrates involves the preparation of an aqueous color dispersion which is dried to remove the water. For instance, U.S. Pat. No. 4,374,641 to Burlone describes the preparation of a color concentrate in an aqueous vehicle using a dispersant which is compatible with the thermoplastic material with which the concentrate will be blended. The aqueous color concentrate is filtered and dried to remove residual water. Both of these methods require an extra step, like flushing or drying.

In the processing of plastics, it has been described that additives may be introduced into the plastic extruder, generally in a finely divided form, such as granules or powders, with devolatilization of the volatiles present within the polymer stream. In the method of U.S. Pat. No. 4,065,532 to Wild et al., the addition of major amounts of compatible liquid additives is described as being preferably done after devolitalization of the polymer.

There remains a need for a process by which additives present in liquid vehicles, which vehicles are not desirable in the final shaped polymer article, may be added to a polymer melt stream without interfering with the polymer's suitability for processing.

SUMMARY OF THE INVENTION

Accordingly, a first embodiment of the present invention is a process for introducing additives into a polymer melt by feeding at least one additive in an at least partially volatile liquid vehicle forming an additive stream to a vented extruder which is extruding a polymer. The fed volatiles are then removed through the extruder vent to achieve a substantially homogeneous system containing the polymer and at least one additive.

In a second embodiment, a process for introducing additives into a polymer melt includes the steps of feeding an additive in a liquid vehicle containing volatiles into a twin screw vented extruder which is extruding a polymer melt stream; mixing the polymer and additive in the extruder; removing the volatiles from the resulting mixture while in the extruder; extruding a resulting substantially homogeneous polymer and additive melt; and directing the resulting polymer and additive melt to a second polymer melt stream.

In a third embodiment, a process for extruding modified thermoplastic articles directly from a thermoplastic melt and an additive in an at least partially volatile vehicle includes using a twin screw vented extruder as the main extruder extruding molten polymer in a polymer shaping process; injecting at least one additive in an at least partially volatile vehicle into the extruder at such a rate as to give the desired additive concentration in the thermoplastic article; removing the injected volatiles in the vent section of the extruder; and shaping the resulting modified molten polymer into an article.

It is an object of the present invention to provide an improved process for adding functional materials to thermoplastic melts.

Related objects and advantages will be readily apparent to one who is ordinarily skilled in the art after considering the following description.

DESCRIPTION OF THE PREFERRED EMBODIMENTS

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

The present invention is a process for introducing soluble or insoluble additives into a polymer melt in an extruder where the additive is present in a vehicle having volatile constituents and shaping the admixed polymer without interference from the volatile vehicle constituents. Shaping may be by spinning into fibers, extrusion into tubes, injection molding or nearly any method known to form a polymer melt into a useful final article.

As an illustration, the process of the present invention is useful in coloring any melt spinnable polyamide such as nylon 6, nylon 6,6, nylon 10, nylon 11, nylon 12 and co-polymers of these. Other thermoplastic polymers, such as polyesters, may improve also from use of the present invention. It is further contemplated that the process of the present invention may be useful for introducing to polymeric melt processes other additives which are present in at least partially volatile vehicles. Examples of other additives which may be introduced are colorants, stabilizers, delusterants, flame retardants, fillers, antimicrobial agents, antistatic agents, optical brighteners, extenders, processing aids and other functional additives. It should be recognized that nearly any additive present in a partially undesirable volatile vehicle could be potentially successfully added to the polymer melt by the present process. Furthermore, it is not necessary that the polymer product resulting from the process is an admixture. However, for purpose of illustration only, the following discussion concerns the preparation of pigmented thermoplastic materials. The principles described below are readily adaptable to suit a particular application as will be apparent to one ordinarily skilled in the art.

The additive is in a vehicle which is at least partially volatile under the conditions. Preferably, regardless of additive solubility, the vehicle will contain a dispersant. When the additive is a pigment and the vehicle is aqueous, this dispersion may be prepared using the water soluble/dispersible polymers of U.S. Pat. No. 3,846,507 as a dispersant. This patent is hereby incorporated by reference for the water soluble/dispersible polymers taught therein. One particularly useful dispersant in this class is a copolymer of caprolactam/hexamethylenediamine/isophthalic acid/sodium salt of sulfoisophthalic acid (hereinafter referred to as C-68 and manufactured by BASF Corporation.) Other related water soluble/dispersible polymers are useful in the present invention. These include, but are not limited to, other water soluble/dispersible polyamides and copolymers thereof, water soluble/dispersible polyesters and copolymers thereof, water soluble/dispersible vinyl polymers and co-polymers thereof, water soluble/dispersible alkylene oxide polymers and co-polymers thereof and water soluble/dispersible polyolefins and co-polymers thereof, as well as mixtures of these. But, of course, other dispersants, like monomeric dispersants, may be suitable for use with the present invention.

The dispersant is preferably present in the dispersion at a concentration of between about 1% by total dispersion weight and about 25% by total dispersion weight and most preferably between about 10% by total dispersion weight and about 20% by total dispersion weight. As is apparent, the level of dispersant needed to most efficiently achieve the desired results will depend upon the particular pigment (or other additive) which is used and the target color density (or function). The upper limit of dispersant is related to the maximum total dispersant and pigment to polymer ratio which can be successfully extruded.

The dispersion may be prepared according to standard methods by, for example, mixing a pigment press cake with dispersant containing water until all of the components of the dispersion are appropriately dissolved and/or dispersed. The pigment concentration of the dispersion is preferably between about 15% and about 50% by total dispersion weight. As with dispersant concentration, the most preferable pigment concentration will depend on color density and processibility of the polymer and dispersant and pigment mix. The dispersion may be subjected to mechanical energy to be certain that the dispersion particles are of sufficiently small and uniform size. This may be accomplished, for example, by milling through a Chicago Boiler Company Model KDL Pilot Dyno Mill or other suitable mill. The reduction in dispersion particle size may be monitored by measuring the Pressure Index.

The Pressure Index (psi pressure increase/gram pigment) is obtained by mixing the desired concentrate with the host polymer to give a pigment concentration of 5%. The 5% concentrate and polymer is extruded at 275° C. through a 35 mm 165×1400 mesh filter screen (nominal 10 micron). The extrudate rate is adjusted so that the pressure drop across the filter screen is about 2000 psi. The test is run for two hours or until the pressure reaches about 3000 psi, whichever comes first. The pressure rise above 2000 psi and the calculated grams of pigment through the filter are used to calculate the Pressure Index.

In one embodiment of the present invention, the dispersion (or additive present in the volatile vehicle) is added to a polymer stream to make a concentrate. In this embodiment, the dispersion is preferably thoroughly mixed with a compatible polymer, preferably of the same type in which the concentrate will finally be used. The intimate mixing occurs preferably by adding the dispersion to a twin screw vented extruder such as those available from Werner & Pfleiderer or American Leistritz. To be sure of intimate mixing, the screw speed and zone temperatures should be monitored and set as appropriate for the particular pigment and thermoplastic material being extruded. The extrusion rate should be monitored, also.

The dispersion is preferably metered into the appropriate zone of the extruder to give a specific predetermined extruder output. Metering may be accomplished by a meshed gear pump, a piston pump, a diaphragm pump or other suitable metering means.

At the appropriate zone, the vehicle is preferably removed by using a LEMA 50 Type 20605 water sealed vacuum pump. The final extrudate, in the case of a pigment concentrate, preferably has a concentration of about 25% pigment, about 15% of dispersant and about 65% of thermoplastic polymer by weight based on total weight of the concentrate.

This concentrate which is substantially homogeneous may then be cooled, cut into chips and dried as desired. The fresh concentrate composition or concentrate chip may be used directly in the production of a thermoplastic polymer having a desired color density. Where the concentrate is used in fiber spinning, the concentrate is preferably added to the polymer so that the final pigment concentration in the fiber is about 1%. Spinning performance of the extruded thermoplastic material may be measured by spin pack pressure rise or estimated by the Pressure Index. In general acceptable spinning performance results in a Pressure Index of about 10 or less. It has been discovered that the Pressure Index achieved with the present invention is easily maintained below 10 and is surprisingly much better than the Pressure Index obtained with presently available commercial pigment concentrates.

In a second embodiment of the present invention, a twin screw vented extruder may be used as a side-arm extruder feeding a molten concentrate containing about 25% by weight of additive directly into a thermoplastic melt supplying a spinning machine (or other shaping apparatus), thereby eliminating the requirement of making a solid concentrate and the subsequent remelting operation.

A thermoplastic resin is metered into the throat of the extruder, an aqueous dispersion containing about 25% additive is metered through an injection port into zone 2 of the extruder and water is removed through a vacuum system from zone 4 of the extruder. The materials are metered at such a rate as to give about 25% by weight additive in the molten concentrate. In the case of fiber spinning, the molten concentrate is metered through a Zenith meter pump or the like into the molten thermoplastic material from a main single screw extruder feeding the spinning machine at a point between the discharge of the single screw extruder and the spin pack/spinneret assembly at a rate to give about 1% additive in the final fiber product. Between the junction of the polymer from the single screw extruder and the concentrate from the twin screw vented side-arm extruder, the mixed polymers should pass through a static mixer to insure additive uniformity in the final fiber product.

In a third embodiment of this invention, a twin screw vented extruder is used as the main and only extruder supplying molten polymer to, for example, a spinning machine. The polymer is metered into the throat of the extruder, an additive in a partially volatile vehicle, preferably a dispersion, containing about 25% additive, in the case of pigmentation, is metered through an injection port into a zone of the extruder and the water is removed from a downstream zone of the extruder by means of a suitable vacuum system. The materials are metered into the extruder at a rate to give about 1% of additive in the final fiber product.

In addition, in some cases the addition of a monomeric surfactant has been surprisingly discovered to disproportionately reduce the amount of the expensive polymeric dispersant necessary for a suitable dispersion to be prepared. Furthermore, in some instances, the use of the monomer surfactant causes additional decreases in the polymer melt pressure index. The production of some black pigment concentrates is exemplary of a process improved by addition of the monomeric surfactant. Surfactants suitable for this purpose include many standard nonionic, cationic and anionic species. Among these are polyethoxylates, polypropoxylates, long chain alcohols, polyalcohols, alkyl-sulfates, alkyl-sulfonates, alkyl-benzenesulfonates, alkyl-phosphates, alkyl-phosphonates, alkyl-napthalene sulfonates, carboxylic acids and perfluoronates.

Two surfactants which are presently preferred are a polyethoxylated alkyl phenol (Triton X-100 (TX100)), and an alkyl benzene sulfonate (sodium dodecylbenzene sulfonate (SDBS)). TX100 yields Pressure Indices less than 5 in the 6.7 to 46.7 wt% range based on the weight of pigment in conjunction with C-68 concentrations as low as 0.5% (based on pigmentary weight). In this aspect, 20% TX100 with 0-10% C-68 is presently preferred.

The invention will now be described by referring to the following detailed examples. These examples are set forth by way of illustration and are not intended to be limiting in scope.

EXAMPLE 1

Preparation of a Perylene Red Concentrate

A dispersion containing 20% Perylene Red, 15% of the water soluble polymer of U.S. Pat. No. 4,098,741 (C-68) (75% based on pigment weight) and 65% water is prepared in the following manner:

37,832 grams of Perylene Red presscake (45% pigment) is added in increments to 46,032 grams of a 25% by weight solution of C-68 in water while stirring with a Cowles mixer. 1262 grams of solid C-68 is added and this pre-mix stirred for one hour.

The dispersion is passed through a Chicago Boiler Company Model KDL Pilot Dyno Mill containing 1200 ml of 1 mm glass beads at 250-300 ml/min. The first liter of dispersion through the mill is discarded. The dispersion is passed through the mill two more times under the same conditions. The first liter through the bead mill on the second and third passes is recycled through the bead mill. The specific gravity of the dispersion after each of the three passes is 1.090. The viscosity of the dispersion after each of the three passes is 16.0, 17.5 and 18.5 cps, respectively, indicating a continuing reduction of particle size with each pass.

The concentrate is prepared on a Werner & Pfleiderer ZDSK co-rotating twin screw vented extruder. The screw speed is 75-100 rpm and the zone temperatures are set at 275° C. The nylon 6 is metered into the throat of the extruder at 16.5 g/min. The dispersion is metered into zone 2 of the extruder at a rate to give a total output of 30 g/min. The water is removed at zone 4 of the extruder using a water aspirator vacuum source. The concentrate composition is 25% pigment, 18.75% C-68 and 56.25% nylon 6, calculated.

The concentrate is dried, mixed with nylon 6 and spun, under normal nylon 6 spinning conditions, into a 760 denier, 14 filament fiber containing 1% Perylene Red pigment.

The spinning performance, as measured by spin filter pack pressure rise, is 0.3 psi/hr.

The Pressure Index (psi pressure rise/gram of pigment) obtained by extruding a mixture of concentrate and nylon 6 at 5% pigment concentration through a nominal 10 micron screen is 0.3.

EXAMPLE 2

Preparation of Mapico Tan 10A Concentrate

A pigment dispersion containing 25% Mapico Tan 10A pigment, 10% C-68 and 65% water is prepared by adding the dry pigment to a 13.33% C-68 solution and stirring with a Cowles mixer for 1 hour. The dispersion is then passed through a Chicago Boiler Company Model KDL Pilot Dyno Mill containing 1200 ml of 1 mm glass beads at 250-300 ml/min. The first liter through the mill is discarded. The dispersion is passed through the mill two more times under the same conditions. The first liter through the mill on the second and third passes is recycled through the mill. The pigment concentrate containing 25% pigment, 10% C-68 and 65% nylon 6 is prepared as described in Example 1 with the nylon 6 and dispersion feed rates adjusted to give a 30 gram/min. throughput.

The 25% concentrate is mixed with nylon 6 to give a 5% pigment concentration and extruded through a nominal 10 micron filter screen. The Pressure Index is 0.

The concentrate is spun into fiber as described in Example 1. The results show the concentrate produced by this method to have a pressure rise of 0.5 psi/hr.

EXAMPLE 3

Preparation of a Raven Black 1200 Concentrate

A pigment dispersion containing 20% Raven Black 1200 pigment, 15% C-68 and 65% water is prepared by adding the dry pigment to a 18.75% C-68 solution and stirred with a Cowles mixer for 1 hour.

The dispersion is passed through a Chicago Boiler Company Model KDL Pilot Dyno Mill containing 1200 ml of 1 mm glass beads at 250–300 ml/min. The first 5 liter through the mill is discarded. The dispersion is passed through the mill two more times under the same conditions. The first liter through the mill on the second and third passes is recycled through the mill. The pigment concentrate containing 20% pigment is prepared as described in Example 1 with the nylon 6 and dispersion feed rates adjusted to give a through put of 30 grams/min.

The 20% concentrate is mixed with nylon 6 to give a pigment concentration of 5% and extruded through a nominal 10 micron filter screen. The Pressure Index is 0.

EXAMPLE 4

Preparation of a TiO$_2$ Concentrate

A pigment dispersion containing 25% Hombitat LO-CR-SM TiO$_2$, 10% C-68 and 65% water is prepared by adding the dry pigment to a 13.33% C-68 solution adjusted to pH 10 with NaOH. The dispersion is stirred with a Cowles mixer for 1 hour. The dispersion is passed through a Chicago Boiler Company Model KDL Pilot Dyno Mill containing 1200 ml of 1 mm glass beads at 250–300 ml/min. The first liter through the mill is discarded. The dispersion is passed through the mill two more times under the same conditions. The first liter through the mill on the second and third passes is recycled through the mill. The pigment concentrate containing 25% pigment is prepared as described in Example 1 with the nylon 6 and dispersion feed rates adjusted to give a throughput of 30 grams/min.

The 25% concentrate is mixed with nylon 6 to give a pigment concentration of 5% and extruded through a nominal 10 micron filter screen. The resulting pressure Index is 0.

EXAMPLE 5

Preparation of a SunFast Blue 248-0748 Concentrate

A pigment dispersion containing 20% SunFast Blue 248-0748 presscake is prepared by adding the 41.13% solids presscake to a 20% C-68 solution. The dispersion is stirred for 1 hour with a Cowles mixer. The dispersion is passed through a Chicago Boiler Company Model KDL Pilot Dyno Mill containing 1200 ml of 1 mm glass beads at 250–300 ml/min. The first liter through the mill is discarded. The dispersion is passed through the mill two more times under the same conditions. The first liter through the mill on the second and third passes was recycled through the mill.

The concentrate is prepared on a Leistritz ZSE-67 GL co-rotating twin screw vented extruder. The screw speed is 150 rpm and the extruder zone temperatures are set at 300° C. The nylon 6 is metered into the throat of the extruder at 35.75 lbs/hr. The dispersion is metered into zone 2 of the extruder at a rate of 81.25 lbs/hr. The water is removed in zone 6 of the extruder at a rate of 52 lbs/hr. The resulting 25% pigment concentrate is extruded at a rate of 65 lbs/hr.

The 25% concentrate is mixed with nylon 6 to give a pigment concentration of 5% and extruded through a nominal 10 micron filter screen. The Pressure Index is 0.

The concentrate is dried, mixed with nylon 6 and spun, under normal nylon 6 spinning conditions, into a 760 denier, 14 filament fiber containing 1% SunFast Blue pigment.

The spinning performance, as measured by spin filter pack pressure rise, is 0.9 psi/hr.

EXAMPLE 6

Preparation of a Heliogen Green K8730 Concentrate

A 25% Heliogen Green K8730 dispersion is prepared by adding the dry pigment to a 16.67% C-68 solution. The dispersion is prepared as described in Example 1. The 25% concentrate is prepared as described in Example 1 with the nylon 6 and dispersion feed rates adjusted to give a through put of 30 grams/min. The Pressure Index, as described in Example 1, is 0.46.

EXAMPLE 7

Preparation of a Sicotan Yellow K1010 Concentrate

A 25% Sicotan Yellow K1010 dispersion is prepared by adding the dry pigment to a 6.67% C-68 solution. The dispersion is prepared as described in Example 1. The 25% concentrate is prepared as described in Example 1 with the nylon 6 and dispersion feed rates adjusted to give a through put of 30 grams/min. The Pressure Index is 5.8.

EXAMPLE 8

Preparation of a Sicotan Yellow K2011 Concentrate

A 25% Sicotan Yellow K2011 dispersion is prepared by adding the dry pigment to a 13.33% C-68 solution. The dispersion is prepared as described in Example 1. The 25% concentrate is prepared, as described in Example 1, with the nylon 6 and dispersion feed rates adjusted to give a through put of 30 grams/min. The Pressure Index is 6.2.

EXAMPLE 9

Preparation of a Cuprous Iodide Concentrate

A Cuprous Iodide concentrate containing 20% CuI, 15% C-68 and 65% water is prepared and extruded as described in Example 2. The 25% concentrate is mixed with nylon 6 to give a 5% stabilizer concentration and extruded through a nominal 10 micron screen. The Pressure Index is 0.

EXAMPLE 10

Preparation of a Gray Concentrate

A 25% gray concentrate is prepared on a Leistritz LSE 30.34 co-rotating twin screw vented extruder. The extrusion rate of the 25% Gray concentrate is 3632 grams/min. The screw speed is set at 75 rpm and the extruder zone temperatures are set at 300° C. Nylon 6 is metered into the throat of the extruder at 2338.1 grams/min. A 20% Raven Black 1200 dispersion, as described in Example 2 is injected into zone 2 at a rate of 324.5 grams/min. A 25% TiO$_2$ dispersion, as described in Example 3, is injected into zone 2 through a separate injection port at a rate of 3372.4 grams/min. The water is removed from zone 8 with a vacuum system at a rate of 2403 grams/min.

The 25% Gray concentrate is mixed with nylon 6 to give a pigment concentration of 5% and extruded through a nominal 10 micron filter screen. The Pressure Index is 0.

EXAMPLE 11

Preparation of a Plum Concentrate

A. A Raven Black 1200 dispersion containing 25% pigment, 12.5% C-68 and 67.5% water, a Mapico Tan dispersion containing 25% pigment, 10% C-68 and 65% water and a Perylene Red dispersion containing 20% pigment, 15% C-68 and 65% water are prepared as described in Example 1. The three dispersions, after being passed through the bead mill three times are mixed together using 7.48% Raven Black 1200 dispersion, 66.63% Mapico Tan 10A dispersion and 25.43% Perylene Red dispersion to give a Plum dispersion containing 23.8% pigment.

The Plum concentrate is then extruded, as described in Example 1, with the nylon 6 and dispersion feed rates adjusted to give a through put of 30 grams/min.

B. Another Plum dispersion is prepared by taking the pre-mix of the dispersions described above in Example 3A and mixing the pre-mixes in the same proportions as described above in Example 3A. The Plum pre-mix is then passed through the bead mill three times as described in Example 1. The 25% Plum concentrate is extruded, as described in Example 1, with the nylon 6 and dispersion feed rates adjusted to give a through put of 30 grams/min.

Each of the above described Plum concentrates is mixed with nylon 6 to give 5% pigment and extruded through a nominal 10 micron filter screen. The Pressure Index for each concentrate is 0.

EXAMPLE 12

Preparation of a Beige Concentrate

A. Equal portions of a 25% Mapico Tan 10A dispersion, as described in Example 2, and a 25% $TiO_2$ dispersion, as described in Example 4, are mixed together for 1 hour with a Cowles mixer before milling. The mixed dispersions are then passed through the bead mill three times as described in Example 1. The 25% Beige concentrate is extruded, as described in Example 5, with the nylon 6 and dispersion feed rates adjusted to give a throughput of 30 grams/min.

The 25% Beige concentrate is mixed with nylon 6 to give a pigment concentration of 5% pigment and extruded through a nominal 10 Micron screen. The Pressure Index is 5.6.

B. Equal portions of a 35% Mapico Tan 10A dispersion, as described in Example 2, and a 25% $TiO_2$ dispersions, as described in Example 4, is mixed together with a Cowles mixer for 1 hour. The 25% Beige concentrate is extruded on a Leistritz ZSE-67 GL co-rotating twin screw vented extruder as described in Example 5. The nylon 6 feed rate is 42.25 lbs/hr., the dispersion feed rate is 65 lbs/hr. and the water removal rate is 42.25 lbs./hr.

The 25% Beige concentrate is mixed with nylon 6 to give a pigment concentration of 5% and extruded through a nominal 10 micron filter screen. The Pressure Index is 0.

The 25% Beige concentrate is dried, mixed with nylon 6 and spun, under normal nylon 6 spinning conditions, into a 760 denier, 14 filament fiber containing 1% Beige pigment. The spinning performance, as measured by spin filter pack pressure rise, is 0.06 psi/hr.

C. A 25% Beige concentrate is prepared on a Leistritz LSE 30.34 co-rotating twin screw vented extruder, as described in Example 9, at a rate of 3632 grams/min. A 25% Mapico Tan 10A dispersion, as described in Example 2, and a 25% $TiO_2$ dispersion, as described in Example 4 are each metered into zone 2 through separate injection ports at a rate of 2388 grams/min. The water is removed from zone 8 at a rate of 2388 grams/min. The 25% Beige concentrate is mixed with nylon 6 to give a pigment concentration of 5% and extruded through a nominal 10 micron filter screen. The Pressure Index is 0.

EXAMPLE 13

Preparation of a Grape Concentrate

A Grape dispersion is prepared by mixing with a Cowles mixer 67.26% of a 20% Perylene Red dispersion (prepared as described in Example 1), 28.79% of a 20% Heliogen Blue dispersion (prepared as described in Example 5), 2.23% of a 20% Raven Black 1200 dispersion (prepared as described in Example 3) and 1.71% of a 20% CuI dispersion (as described in Example 9). The resulting Grape dispersion contained 20% pigment and stabilizer, 15% C-68 and 65% water.

The polymer used is a mixture of 68.38% nylon 6 and 31.64% of a commercially available $TiO_2$ concentrate containing 30% $TiO_2$.

The concentrate is extruded, as described in Example 1, with a polymer feed rate of 20.24 grams/min. and a dispersion feed rate of 27.88 grams/min. The water removal rate was 18.12 grams/min. and the extruder throughput was 30 grams/min.

The Grape concentrate contained 25% pigment and stabilizer, 15% C-68 and 65% nylon 6. The Grape concentrate was mixed with nylon 6 to give a pigment concentration of 5% and extruded through a nominal 10 micron filter screen. The Pressure Index was 0.61.

What is claimed is:

1. A process for introducing additives into a thermoplastic melt comprising:
    a) feeding at least one additive in an aqueous vehicle containing a dispersant to form an aqueous additive stream to a vented extruder which is extruding a thermoplastic;
    b) volatilizing the aqueous portion of the aqueous additive stream;
    c) removing substantially all the volatilized aqueous portion through the extruder vent to achieve a substantially homogeneous system containing the thermoplastic and at least one additive; and
    d) forming a fiber from the homogeneous system by extrusion of the system through a spinneret.

2. The process of claim 1 wherein the additive is at least one or more pigment, stabilizer, delusterant, antimicrobial agent, antistatic agent, optical brightener, extender, filler, flame retardant, processing aid, nonpigment colorant, or a mixture thereof.

3. The process of claim 1 wherein the extruder is a twin screw vented extruder.

4. The process of claim 1 wherein the dispersant is selected from the group consisting of:
    water dispersible/soluble polyamides or copolymers;
    water dispersible/soluble polyesters or copolymers;
    water dispersible/soluble vinyl polymers or copolymers;
    water dispersible/soluble alkaline oxide polymers or copolymers;
    water dispersible/soluble polyolefines or copolymers; and
    mixtures thereof.

5. The process of claim 4 wherein the dispersant is a water dispersible/soluble copolymer of caprolactam/-hexamethylenediamine/isophthalic acid/sulphonated isophthalic acid or a salt thereof.

6. The process of claim 1 wherein the thermoplastic melt is nylon 6.

7. The process of claim 1 wherein said feeding is through at least one injection port and is of more than one additive stream.

8. The process of claim 1 wherein the achieved substantially homogeneous system is a concentrate.

9. A process for introducing additives into a thermoplastic melt comprising:
   a) feeding an additive in an aqueous vehicle containing a dispersant into a twin screw extruder which is extruding a thermoplastic melt stream;
   b) mixing the thermoplastic and additive in the extruder;
   c) removing the aqueous portion from the resulting mixture while in the extruder;
   d) extruding a resulting substantially homogeneous thermoplastic and additive melt; and
   e) forming a fiber from the substantially homogeneous thermoplastic and additive.

10. The process of claim 9 and further comprising directing the resulting thermoplastic and additive melt to a second polymer melt stream.

11. The process of claim 10 wherein the extruder is a side-arm extruder.

12. The process of claim 11 wherein the second polymer melt stream is supplying a spinning machine for said forming.

13. The process of claim 9 wherein the additive is at least one or more pigment, stabilizer, delusterant, antimicrobial agent, antistatic agent, optical brightener, extender, filler, flame retardant, processing aid, nonpigment colorant, or a mixture thereof.

14. The process of claim 9 wherein the dispersant is selected from the group consisting of:
   water dispersible/soluble polyamides or copolymers;
   water dispersible/soluble polyesters or copolymers;
   water dispersible/soluble vinyl polymers or copolymers;
   water dispersible/soluble alkaline oxide polymers or copolymers;
   water dispersible/soluble polyolefines or copolymers; and
   mixtures thereof.

15. The process of claim 14 wherein the dispersant is a water dispersible/soluble copolymer of caprolactam/-hexamethylenediamine/isophthalic acid/sulphonated isophthalic acid or a salt thereof.

16. The process of claim 15 wherein the thermoplastic melt is nylon 6.

17. The process of claim 10 wherein said feeding is through at least one injection port and is of more than one additive stream.

18. A process for extruding fiber directly from a thermoplastic melt and an additive in an aqueous vehicle containing a dispersant comprising:
   a) using a twin screw extruder as the main extruder extruding molten polymer in a fiber spinning process;
   b) injecting at least one additive in an aqueous vehicle into the extruder at such a rate as to give the desired additive concentration in the fiber;
   c) removing the injected aqueous portion of the vehicle in the vent section of the extruder; and
   d) shaping the resulting modified molten thermoplastic polymer into a fiber.

19. The process of claim 18 wherein the additive is at least one or more pigment, stabilizer, delusterant, antimicrobial agent, antistatic agent, optical brightener, extender, filler, flame retardant, processing aid, nonpigment colorant, or a mixture thereof.

20. The process of claim 18 wherein the dispersant is selected from the group consisting of:
   water dispersible/soluble polyamides or copolymers;
   water dispersible/soluble polyesters or copolymers;
   water dispersible/soluble vinyl polymers or copolymers;
   water dispersible/soluble alkylene oxide polymers or copolymers;
   water dispersible/soluble polyolefines or copolymers; and
   mixtures thereof.

21. The process of claim 20 wherein the dispersant is a water dispersible/soluble copolymer of caprolactam/-hexamethylenediamine/isophthalic acid/sulphonated isophthalic acid or a salt thereof.

22. The process of claim 18 wherein the additive is a pigment present in an aqueous dispersion containing a water dispersible/soluble copolymer of caprolactam/-hexamethylenediamine/isophthalic acid/sulphonated isophthalic acid or a salt thereof and the polymer is nylon 6.

23. The process of claim 22 wherein the aqueous dispersion contains from about 1 to about 25% pigment by weight of the total dispersion; from about 0.5 to 40% of the dispersant.

* * * * *

UNITED STATES PATENT AND TRADEMARK OFFICE
CERTIFICATE OF CORRECTION

PATENT NO. : 5,236,645
DATED : August 17, 1993
INVENTOR(S) : Frank R. Jones

It is certified that error appears in the above-identified patent and that said Letters Patent is hereby corrected as shown below:

At column 5, line 66, please delete "4,098,741" and put
—3,846,507— in its place.

Signed and Sealed this

Thirtieth Day of August, 1994

Attest:

BRUCE LEHMAN

Attesting Officer

Commissioner of Patents and Trademarks